United States Patent [19]

Rehbold et al.

[11] Patent Number: 5,565,270
[45] Date of Patent: Oct. 15, 1996

[54] PROCESS FOR THE PRODUCTION OF ELASTANE FILAMENTS

[75] Inventors: Bodo Rehbold, Köln; Hans-Josef Behrens, Dormagen; Erich Haug, Pulheim; Günter Spilgies, Dormagen; Rolf-Volker Meyer, Leverkusen; Hanns-Peter Müller, Odenthal-Höffe, all of Germany

[73] Assignee: Bayer Aktiengesellschaft, Leverkusen, Germany

[21] Appl. No.: 423,917

[22] Filed: Apr. 18, 1995

[30] Foreign Application Priority Data

Apr. 25, 1994 [DE] Germany ............ 44 14 327.3

[51] Int. Cl.$^6$ .................................................. C08G 18/77
[52] U.S. Cl. .................. 428/364; 528/73; 528/906; 264/177.13; 264/177.19
[58] Field of Search ............... 528/73, 906; 264/177.13, 264/177.19; 428/364

[56] References Cited

U.S. PATENT DOCUMENTS

| 3,719,708 | 3/1973 | Thoma et al. ............ 564/37 |
| 4,788,224 | 11/1988 | Muller et al. ............ 521/104 |

FOREIGN PATENT DOCUMENTS

| 0256470 | 2/1988 | European Pat. Off. . |
| 0272563 | 6/1988 | European Pat. Off. . |
| 0397121 | 11/1990 | European Pat. Off. . |
| 0454160 | 10/1991 | European Pat. Off. . |
| 4115508 | 11/1992 | European Pat. Off. . |
| 1295190 | 5/1969 | Germany . |
| 1669402 | 2/1971 | Germany . |
| 2542500 | 4/1977 | Germany . |
| 2832352 | 1/1980 | Germany . |
| 3233384 | 3/1984 | Germany . |
| 1144233 | 10/1966 | United Kingdom . |

OTHER PUBLICATIONS

H. Grunewald, Textilproxis International vol. 36, pp. 839–841 (1981).
D. Oertel, Chemiefaser/Testilindustrie vol. 28/80, No. 1/78, pp. 44–49 (1978).
Houben–Wegl, "Methoden der organischen Chemie", vol. E20, Markromolekulare Stoffe, ed. H. Bartl, et al., pp. 1739–1748 George Thieme Verlag, New York (1987).
K. Schauerte, Kanststoff–Handbuch, 2nd ed, vol. VII, ed. Oertel, pp. 63–74 Carl–Hanser–Verlog, Munich (1983).
Chemical Abstracts, vol. 72, No. 6, Abstract No. 22527r, (1970).

*Primary Examiner*—Rachel Johnson
*Attorney, Agent, or Firm*—Sprung Horn Kramer & Woods

[57] ABSTRACT

The invention relates to a process for the solventless production of elastic filaments based on segmented poly(urethane)s or poly(urethane urea)s having improved thermal properties and, hence, improved processing behavior, for example during the heat setting of fabrics containing the elastic fibers, by the use of a polyisocyanate containing isocyanurate groups in the reaction of long-chain, relatively high molecular weight polyhydroxyl compounds with organic diisocyanates and low molecular weight diols and, optionally, other auxiliaries and additives in the melt, direct spinning of the reaction mixture thus obtained and thermal aftertreatment of the elastic filaments obtained and also to the filaments obtainable by this process.

16 Claims, No Drawings

PROCESS FOR THE PRODUCTION OF ELASTANE FILAMENTS

This invention relates to a process for the solventless production of elastic filaments based on segmented poly(urethane)s or poly(urethane urea)s having improved thermal properties and, hence, improved processing behavior, for example during the heat-setting of fabrics containing the elastic fibers, by the use of a polyisocyanate containing isocyanurate groups in the reaction of long-chain, relatively high molecular weight polyhydroxyl compounds with organic diisocyanates and low molecular weight diols and, optionally, other auxiliaries and additives in the melt, direct spinning of the reaction mixture thus obtained and thermal aftertreatment of the elastic filaments obtained. The invention also relates to the filaments obtainable by this process.

Elastane filaments are understood to be endless filaments of which at least 85% by weight consist of segmented poly(urethane)s or poly(urethane urea)s. The filament-forming polymers have a segment structure, i.e. they consist of "crystalline" and "amorphous" blocks ("hard segments" and "soft segments"). By virtue of their "crystallinity", the hard segments act as fixed points of the network and hence determine the strength of the molded articles or fibers produced from the polymers. By contrast, the soft segments—of which the glass temperature must be below the service temperature—determine the elasticity of the elastomers.

Elastomers of the type in question are normally prepared by polyaddition of long-chain dihydroxyl compounds (macrodiols) with diisocyanates and low molecular weight dihydroxyl or diamino compounds as chain-extending agents. Poly(urethane urea)s obtained by chain extension with diamines are used for high-quality elastane filaments (spandex) because, on the one hand, they have high hard-segment melting points in relation to diol-extended poly(urethane)s by virtue of a larger number of hydrogen bridge bonds between the polymer chains and, on the other hand, exhibit excellent mechanical/elastic properties. The elastane fibers are normally produced by spinning of solutions of these segmented poly(urethane urea)s in highly polar solvents, such as dimethyl formamide and dimethyl acetamide, using the dry spinning or wet spinning process.

By virtue of the absence of these high-boiling aprotic solvents, melt spinning is preferable in principle to solution spinning on economic and ecological grounds. However, elastanes, for example of diamine-extended poly(urethane urea)s cannot be melted without decomposition of the urea groups in the hard segments, as known for example from Texilpraxis International 36 (1981), page 841. Accordingly, they cannot be processed from the melt. By contrast, so-called thermoplastic poly(urethane)s predominantly containing urethane hard segments, which are obtained by chain extension with low molecular weight diols instead of diamines, can be spun from the melt to form elastic filaments with only a limited reduction in molecular weight. Unfortunately, the use of filaments such as these is limited by the fact that, on account of relatively minor binding interactions between their hard segments and the resulting relatively low softening temperature, they are unable to withstand the high temperatures occurring in the typical processing and treatment of elastanes. This applies in particular to the heat-setting behavior of the elastic filaments during processing with polyamide as the hard fiber component at 195° C. Thus, the processing of commercially available thermoplastic poly(urethane)s does not lead to useful filaments or fabrics.

To increase the thermal stability of elastic filaments of thermoplastic poly(urethane)s, the binding interactions between the macromolecules, more particularly between the hard segments, need to be improved.

According to the prior art, this can be done by increasing the crystallinity of the hard segments. Thus, DE 32 33 384 A1 describes poly(urethane) elastomers of which the hard segments contain trans-1,4-cyclohexane diisocyanate and bis-ethoxylated bisphenol A and which are distinguished by a hard segment structure of high order and crystallinity. The elastic filaments produced therefrom by melt spinning have a softening point which is high enough to enable the fibers to withstand the high temperatures encountered during dyeing, washing, heat setting, ironing, etc. Unfortunately, the disadvantage of this process lies in the use of a toxicologically unsafe diisocyanate. In addition, the elastic filaments thus produced show excessive residual elongation.

EP 0 256 470 A2 describes poly(urethane) elastomers which can be spun into elastic filaments with long hotbreak times (a measure of resistance to thermal deformation in the stretched state). The filaments are characterized by the use of liquid crystalline chain-extending agents which are capable of forming mesogenous structures in the hard segments. Unfortunately, chain-extending agents such as these are difficult and expensive to produce and are not commercially available. In addition, the filaments also show clearly excessive residual elongation.

Another method of intensifying the interactions between the macromolecules of poly(urethane)s is to introduced chemical crosslinkages, more particularly between the hard segments. In practice, this is normally done by using an excess—based on the quantity of the hydroxyl groups of the macrodiol and the chain extender—of difunctional or more than difunctional polyisocyanates in the synthesis or processing of the poly(urethane) and subsequent thermal aftertreatment. Chemical crosslinkages via allophanate, biuret, urethane or urea bonds are obtained in dependence upon the type of chain extender used.

Thus, according to DE-OS 1 669 402, PU filaments with a high resistance to thermal deformation and plastic flow can be produced by melt spinning of a mixture of linear, OH-terminated thermoplastic poly(urethane)s and blocked triisocyanates of 2,4-toluene diisocyanate, such as the isocyanurate or the reaction product with trimethylol propane. The last-mentioned product is also mentioned for the same purpose in GB-PS 1,144,233. However, the particular disadvantage of this process lies in the release of the blocking agent as the filaments emerge from the spinneret which makes the filaments difficult to process and adds considerably to the cost of the process. In addition, the stated strength of the filaments no longer satisfies modern quality requirements.

In a process described, for example, in JP 80-188089 and in EP 0 454 160 A2, a polyisocyanate is added shortly before spinning to the melt obtained by melting granules of a thermoplastic poly(urethane), so that crosslinking allophanate structures are mainly produced in the filaments. Suitable polyisocyanates are said to be diisocyanates, trimers of diisocyanates, reaction products of trimethylol propane with diisocyanates, carbodiimide-modified isocyanates. An isocyanate prepolymer is preferably used. This process avoids a blocking agent. However, the remelting of granules is uneconomical. In addition, the high temperatures prevailing during melting lead to non-reproducible degradation reactions within the polymer chains of the poly(urethane) which can have an adverse effect on the textile properties of the filaments. In addition, allophanate bonds easily split back under the effect of heat with the result that the filaments show only limited thermal stability.

The process described by way of example in JP 51-26321 and mentioned as preferred in EP 0 397 121 A2 avoids the disadvantage of a two-stage process by direct spinning of the melt formed in the synthesis of the thermoplastic poly(urethane) by bulk polyaddition. An excess of the diisocyanate used is actually employed in the synthesis of the polyurethane, so that mainly crosslinking allophanate structures are again produced. However, it is pointed out that a high crosslink density and hence a large excess of isocyanate is required for the production of particularly heat-resistant elastic filaments which, unfortunately, has an adverse effect on the spinnability of the melt. This problem is also emphasized in DE-OS 4 115 508 A1 for the processing of thermoplastic poly(urethane)s.

In view of these adverse effects of a large excess of isocyanate and hence a high crosslink density on the spinnability of poly(urethane) melts, it has not yet been possible to produce filaments which combine processing and mechanical/elastic properties comparable with poly(urethane urea) elastanes with comparable thermal stability, as reflected in high heat distortion temperatures (HDT) and above all in the hot-break time.

The problem addressed by the present invention was to provide a process for the production of elastic poly(urethane) filaments which, in particular, would have the following advantages:

1. Production of the poly(urethane) and spinning would not involve the addition of a solvent and hence would be inexpensive.
2. The release of decomposition products during spinning and aftertreatment, more particularly thermal aftertreatment, would be avoided.
3. Production of the poly(urethane) and spinning would take place continuously, thus avoiding property disadvantages in the filaments through thermal degradation of the poly(urethane) during the melting of granules.
4. The process would lead to elastic filaments having improved thermal stability, more particularly with a hot-break time of at least 10 s, and hence selective thermofixability at a temperature of 195° C.

This problem has been solved by the provision of the process according to the invention which is described in more detail hereinafter.

It has surprisingly been found that elastane filaments having a long hot-break time and hence high resistance to thermal deformation can be produced if, in addition to the difunctional polyisocyanates known per se, at least one more than difunctional polyisocyanate containing isocyanurate groups is used in the solventless synthesis of the poly(urethane) and the PU reaction melt is directly spun without any further intermediate steps.

Equally surprising was the fact that the processing properties and, in particular, the spinnability of the PU reaction melt are not adversely affected by the use of the more than difunctional polyisocyanate in accordance with the invention.

The present invention relates to a process for the production of elastane filaments by reaction of
a) macrodiols, preferably linear macrodiols, having a molecular weight of 1000 to 8000 with
b) at least one diisocyanate,
c) at least one polyisocyanate having an average functionality of greater than 2,
d) diols having a molecular weight of up to 400 as chain-extending agent,
e) optionally catalysts and
f) optionally other auxiliaries and additives, spinning of the polyurethanes obtained therefrom to form filaments and aftertreatment of the filaments obtained, characterized in that a mixture of component (b) and component (c) is used in the poly(urethane) synthesis, component (c) consisting of an isocyanurate polyisocyanate with an average functionality of greater than 2, components (b) and (c) being used in such a quantity ratio that the ratio of the number of isocyanate equivalents of component (b) to the number of isocyanate equivalents of component (c) is 99.5:0.5 to 80:20, synthesis of the polymer being continuous, the reaction melt formed being directly spun without any further intermediate steps and the elastane filaments obtained being thermally aftertreated.

Unless otherwise specifically stated, molecular weights are expressed as number averages $M_n$.

The macrodiols (a) are the compounds known for the production of thermoplastic poly(urethane)s or elastic filaments from poly(urethane)s and poly(urethane urea)s which are described, for example, in DE-A 2 832 352 or in U.S. Pat. No. 3,719,708. Examples of such compounds are polyester diols, polyether diols, polyacetal diols, polycarbonate diols and other dihydroxyl compounds with a molecular weight in the range from 1,000 to 8,000, preferably in the range from 1,000 to 6,000 and more preferably in the range from 1,500 to 4,000. Polyester diols and polyether diols or mixtures thereof are particularly preferred.

Suitable polyester diols are, for example, dicarboxylic acid polyesters of aliphatic dicarboxylic acids which may contain both several diols and several dicarboxylic acids or hydroxycarboxylic acids. Particularly suitable polyester diols are mixed polyesters of relatively long-chain dicarboxylic acids preferably containing 6 or more carbon atoms, such as sebacic acid, azelaic acid and preferably adipic acid, and 2 to 4 different, preferably relatively long-chain diols containing in particular four or more carbon atoms. Particularly suitable diols for these polyesters are hexane-1,6-diol, butane-1,4-diol, 2,2-dimethylpropane-1,3-diol and 3-methylpentane-1,5-diol. Lactone polyester diols or mixed polyester diols based on ε-caprolactone and methyl valerolactone are suitable as compounds a).

Suitable long-chain polyether diols are, in particular, polytetramethylene oxide diols or copolyethers thereof with other ether-forming compounds, such as ethylene oxide or propylene oxide. Mixtures of the compounds mentioned may also be used.

Component (b) may be any one of the aromatic diisocyanates typically used in the production of PU elastomers as described, for example, in Kunststoff-Handbuch, Vol. VII, edited by Oertel, Carl-Hanser-Verlag, München, 2nd Edition, 1983, pages 63 to 74. They are optionally used in combination with (relatively small quantities of) (cyclo)aliphatic diisocyanates, although the (cyclo)aliphatic diisocyanates may even be used on their own. Particularly preferred filaments are obtained with the following diisocyanates: with 2,4-toluene diisocyanate and corresponding isomer mixtures of 2,4/2,6-diisocyanate and in particular with 4,4'-diphenyl methane diisocyanate or corresponding isomer mixtures with small, technical quantities of 2,4'- and/or 2,2'-isomers. In a particularly preferred embodiment, pure 4,4'-diphenyl methane diisocyanate is used. Mixtures of aromatic diisocyanates may of course be used. In addition, suitable mixture components or individual components are, for example, the following (cyclo)aliphatic diisocyanates, more particularly 1,6-hexamethylene diisocyanate, 1,8-octamethylene diisocyanate, 2,3-methyl-1,6-hexamethylene diisocyanate or 2,4-diisocyanato-1-methyl cyclohexane and the 4,4'-dicyclohexyl alkylidene, 4,4'-dicyclohexyl ether diisocyanates in their various stereoisomers or stereoisomer mixtures.

Component (c) may consist, for example, of any of the isocyanurate-modified polyisocyanates known per se which are described, for example, in HOUBEN-WEYL, "Methoden der organischen Chemie", Vol E20 "Makromolekulare Stoffe", edited by H Bartl and J Falbe, Georg Thieme Verlag, Stuttgart, New York, 1987, pages 1739 to 1748. The oligomerization products of the aromatic and (cyclo)aliphatic diisocyanates mentioned in the description of component (b) are preferably used. Particular preference is attributed to the commercially readily available oligomer of 2,4-toluene diisocyanate and to the corresponding isomer mixtures of 2,4- and 2,6-diisocyanate and, in particular, to the oligomer of 4,4'-diphenyl methane diisocyanate or corresponding isomer mixtures with small quantities of 2,4'- and/or 2,2'-isomers which may be used either individually or in the form of a mixture. Other mixture components or individual components are, for example, the oligomers of the (cyclo)aliphatic diisocyanates mentioned in connection with (b), the oligomers of 1,6-hexamethylene diisocyanate being particularly preferred.

It is also possible to use intermediate products containing oxazolidinone and isocyanurate groups which, according to EP 0 272 563 A2 and U.S. Pat. No. 4,788,224, are obtained by reaction of at least one organic polyisocyanate with at least one organic compound containing at least two epoxide groups in a quantity corresponding to an equivalent ratio of isocyanate groups to epoxide groups of 1.2:1 to 500:1 using a tertiary amine as catalyst, the reaction being terminated at a conversion of at most 65% of the isocyanate groups present in the starting mixture by addition of an alkylating sulfonic acid alkyl ester of methyl iodide or dimethyl sulfate in a quantity at least equivalent to the quantity of amine. The diisocyanates mentioned in the description of component (b), preferably 2,4-toluene diisocyanate and corresponding isomer mixtures of 2,4- and 2,6-diisocyanate, but especially 4,4'-diphenyl methane diisocyanate, are used as the organic polyisocyanate. Polyglycidyl ethers of polyhydric phenols, more particularly bisphenol A, are preferably used as the polyepoxide compounds.

Component (d) may be any of the diol compounds with a molecular weight of up to 400 which are typically used in the production of thermoplastic poly(urethane)s. They may be used individually or in the form of mixtures. Examples of such diols are ethane-1,2-diol, propane-1,2- and -1,3-diol, 2,2-dimethylpropane-1,3-diol, hexane-1,6-diol, 3-methylpentane-1,5-diol, 1,4-cyclohexane diol, 1,4-bis-(2-hydroxyethoxybenzene) and bis-(2-hydroxyethoxy)-terephthalate. 1,4-Bis-(2-hydroxyethoxybenzene) and hexane-1,6-diol are preferably used as chain extenders, butane-1,4-diol being particularly preferred. In addition to the diols, higher polyols, for example trimethylol propane, glycerol, hexane-1,2,6-triol, trimethylol ethane and pentaerythritol, may also be used in quantities of up to 5% by weight, based on component (d).

Aliphatic amines, for example ethylenediamine, 1,4-tetramethylenediamine, hexamethylenediamine, hydrazine and substituted hydrazines and amino alcohols, for example ethanolamine, diethanolamine and 3-aminopropanol, may optionally be used as co-chain extenders in quantities of up to 10% by weight of the total quantity of component (d).

In consistency with the process according to the invention, other compounds containing groups monofunctional to isocyanates may optionally be used as so-called chain terminators in addition to the chain extenders mentioned. The compounds in question include, for example, monoalcohols, such as butanol, 2-ethyl hexanol, octanol, dodecanol, the various amyl alcohols, cyclohexanol and ethylene glycol monomethyl ether, and also monoamines, for example diethylamine, butyl and dibutylamine, octylamine, stearylamine, methyl stearylamine, pyrrolidine, piperidine and cyclohexylamine.

Suitable catalysts (e), which in particular accelerate the reaction between the NCO groups of the polyisocyanates (b) and (c) and the hydroxyl groups of synthesis components (a) and (d), are the usual tertiary amines known from the prior art such as, for example, triethylamine, N,N-dimethyl cyclohexylamine, N-methyl morpholine, N,N'-dimethyl piperazine, 1,4-diazabicyclo[2,2,2]octane and the like and, in particular, organometallic compounds such as titanic acid esters, for example dibutyl titanium bis(acetylacetonate), iron compounds, tin compounds, for example tin(II) acetate, tin(II) octoate and tin(II) laurate or the dialkyl tin salts of aliphatic carboxylic acids, such as dibutyl tin dilaurate, dibutyl tin diacetate, dioctyl tin diacetate or the like. The catalysts are normally used in quantities of 0.001% by weight to 0.1% by weight per 100 parts by weight of the mixture of polyhydroxyl compounds (a) and diols (d). In one particularly preferred embodiment of the process according to the invention, no catalyst is added.

The auxiliaries and additives (f) known per se, which serve various purposes, may be added in effective quantities both to the raw materials and also to the melt to be spun. They include, for example, antioxidants, light stabilizers, UV absorbers, decorative dyes, pigments, dyeing additives, antistatic agents, adhesive additives, such as magnesium, calcium, lithium, zinc and aluminium salts of long-chain carboxylic acids, such as stearates and palmitates, or dimer fatty acids or mixtures of these salts, stearic acids, stearyl alcohol, stearic acid esters and amides and also fatty acid esters of pentaerythritol or even additions of fine-particle zinc oxides which may contain up to 15% by weight of other oxides, for example magnesium oxide or calcium oxide or carbonates, for example calcium or magnesium carbonates. Zinc oxides such as these in conjunction with alkaline earth metal oxides or carbonates as additives effectively stabilize ether and polyester elastomer filaments against chlorine-containing water (detergents/swelling baths/bleaches) without having to meet stringent purity requirements, for example in regard to the zinc oxide or trace sulfur content.

To obtain adequate mechanical properties of the elastic filaments produced by the process according to the invention, including for example high elasticity, minimal residual elongation and good recovery behavior, components (a), (b), (c) and (d) are preferably reacted in such a quantity ratio that the sum of components (b) and (c) and (d) in the elastic filaments makes up from 15% to 30% by weight and preferably from 18% to 25% by weight, based on the sum of components (a) and (b) and (c) and (d).

In addition, the ratio of the sum of isocyanate equivalents of components (b) and (c) to the sum of equivalents of zerewitinoff-active hydrogen atoms of components (a) and (d) in the elastic filaments produced by the process according to the invention, based on the starting materials before the reaction, is preferably between 1.00 and 1.15 and more preferably between 1.03 and 1.10.

In addition, the ratio of the number of isocyanate equivalents of component (b) to the number of isocyanate equivalents of component (c) must be 99.5:0.5 to 80:20 and preferably 98:2 to 90:10 for the process according to the invention. If the ratio of 99.5:0.5 is exceeded, the filaments obtained have inadequate thermal properties and, in particular, an inadequate hot-break time. By contrast, if the ratio in question falls below 80:20, there is a significant deterioration in the spinnability of the poly(urethane) melt.

To carry out the process according to the invention, the starting materials (a) to (f) are continuously reacted in the absence of a solvent to form a poly(urethane), for example in multiscrew extruders. Through the use of component (c) in the production of the poly(urethane), the crosslinking polyisocyanates containing isocyanurate groups are largely incorporated via urethane bonds which are thermally more stable than allophanate bonds. The reaction may be carried out both by the known one-shot process, i.e. by combining the reaction components and allowing them to react out to form the polymer, or by the prepolymer process. In the prepolymer process, i) a prepolymer is prepared discontinuously or continuously, preferably in several steps, from at least parts of component (a) and at least parts of components (b) and (c), the ratio of the sum of isocyanate equivalents of components (b) and (c) to the number of hydroxyl equivalents of component (a) in the prepolymer being 1.05:1 to 10:1, preferably 1.1:1 to 6:1 and more preferably 1.5:1 to 4:1 and ii) the prepolymer obtained is reacted with the remaining starting materials and the remainders of components (a), (b) and (c) to form the poly(urethane).

The prepolymer process has the advantages that the reaction is more constant and that the reaction melt shows better processing behavior during spinning. Accordingly, the prepolymer process is preferably used. The auxiliaries and additives may be incorporated in one or even more of the starting materials in the process according to the invention. However, they may also be added to the reaction mixture individually or in admixture at any stage of the polymer synthesis process. Such additives as, for example, the usual spinning additives and stabilizers are preferably added to the polymer melt immediately before spinning.

In the process according to the invention, the reaction melt obtained from the polymer synthesis is pressed continuously through nozzles by means of a spinning pump, i.e. without a cooling, granulation and remelting stage, the filaments obtained are cooled, optionally stretched and wound up. The filaments are then subjected to a thermal aftertreatment during which the required mechanical and, in particular, thermal properties of the filaments are established.

In one preferred variant of the process according to the invention, the total quantity or at least parts of components (a), (b) and (c) are reacted at temperatures of 70° to 150° C. and preferably at temperatures of 80° to 120° C. in a first stage to form an isocyanate prepolymer which is then optionally mixed with the remaining components (a), (b) and (c).

Chain extension is then carried out, for example, in a self-cleaning multiscrew extruder optionally equipped with kneading elements at a temperature of 80° C. to 260° C. It is best to use screw extruders which are made up of several separately heatable and coolable housing sections and which are divided up into a feed zone (addition of the reaction components), reaction zones and an extrusion zone. In the practical application of the preferred process according to the invention, the prepolymer from the first stage and the remaining components are continuously introduced into the screw extruder—either individually or partly mixed—at the same point (preferably into the first housing) or at various points. The prepolymer—optionally premixed with other components and component (d) are preferably introduced into the first housing. Auxiliaries and additives, for example the usual spinning additives and stabilizers, are preferably added after the reaction zone. The temperature in the feed zone is in the range from 70° to 150° C. and preferably in the range from 90° to 120° C., the temperature in the reaction zone is in the range from 100° C. to 260° C. and preferably in the range from 150° C. to 240° C. and the temperature in the extrusion zone is in the range from 150° C. to 250° C. and preferably in the range from 190° C. to 220° C. The residence time of the melt in the screw extruder is generally between 0.5 and 20 minutes, preferably between 1 and 10 minutes and, more preferably, 5 minutes.

The reaction melt is then continuously delivered to the spinning nozzles by a spinning pump arranged at the end of the screw and the filaments are run off at a rate of 100 m/min. to 800 m/min. and preferably at a rate of 200 m/min. to 600 m/min., more particularly at a spinning nozzle temperature of 180° to 240° C. and preferably 190° to 225° C. The filaments formed are cooled, for example by blowing with air, and are wound up, optionally after continuous stretching, preferably cold stretching at room temperature in a ratio of 1.1 to 4:1 and preferably 1.1 to 2:1 followed by relaxation and, optionally, the application of one of the finishes typical of elastanes. Both monofilaments and multifilaments—preferably monofilaments —can be produced by the process according to the invention.

The filaments are then subjected to a thermal aftertreatment, more particularly at a temperature of 60° C. to 120° C. and preferably at a temperature of 80° C. to 100° C., for 1 hour to 96 hours and preferably for 16 hours to 48 hours. The thermal aftertreatment may be carried out both in vacuo and in air or inert gases, preferably in air.

The elastic filaments produced by the process according to the invention, to which the present invention also relates, are distinguished by minimal residual elongation of 5% to 20% and, more particularly, 5% to 15% for high elongation of 350% to 550% and preferably 450% to 550%.

In particular, the elastic filaments produced by the process according to the invention show high stability to heat and plastic flow, as reflected in an HDT (heat distortion temperature) value above 185° C. and, above all, in a hot-break time of at least 10 s and preferably at least 15 s.

The elastic filaments may be excellently processed either individually or in combination yarns together with other filaments, for example of polyamide, wool, cotton and polyester, for example by means of warp knitting machines, circular knitting machines and flat bed knitting machines. Apart from their use in hosiery, the elastic filaments produced by the process according to the invention are particularly suitable by virtue of their high thermal stability for use in applications requiring selective heat setting behavior, for example lingerie, corsetry, sports clothing, outer clothing and covering materials.

The present invention also relates to the use of the elastane filaments obtained by the process according to the invention for the production of fabrics. Measuring methods:

The variables mentioned in the Examples were determined as follows.

The intrinsic viscosity ($\eta_i$) of the elastomers was determined on a dilute solution of 0.5 g/100 ml of solvent (99% by weight dimethyl acetamide, 1% by weight di-n-butylamine) at 30° C. by measurement of the relative viscosity $\eta_r$ against the pure solvent and converted on the basis of the following equations:

$$\eta_r = \frac{t_i}{t_0} \qquad \eta_i = \frac{\ln \eta_r}{c}$$

where t$_i$ is the throughflow time (s) of the polymer solution t$_0$ is the throughflow time (s) of the pure solvent and c is the concentration of the elastomer solution (g/dl).

Tenacity was determined in accordance with DIN 53815 (cN/dtex). Maximum tensile elongation (in %) was also determined in accordance with DIN 53815. The modulus at and 300% initial elongation was determined at an elongation rate of $4 \times 10^{-3}$ m/s in cN/dtex. The residual elongation was determined after elongation five times to with a recovery time of 60 s in between. The heat distortion temperature (HDT) and hot break time (HBT) were determined by the methods described in the journal Chemiefaser/Textilindustrie, January 1978, No. 1/78, Vol. 28/80, pages 44 to 49. Corresponding particulars can also be found in DE-OS 2 542 500.

In the following Examples, all percentages are by weight, unless otherwise indicated.

Comparison Example 1 a) 4,935 Parts by weight (19.7 moles) of 4,4'-diphenyl methane diisocyanate are reacted with 15,000 parts by weight (7.4 moles) of poly(hexanediol-co-neopentyl glycol adipate)diol (OH value 55.0) in a stirred tank reactor at a temperature of 80° C. After a reaction time of 60 minutes, the isocyanate content is 5.17%. The viscous prepolymer obtained is used without cooling in the next stage.

b) 100 Parts by weight of the prepolymer from a) and, in a separate stream, 5.22 parts by weight (0.058 mole) of butane-1,4-diol are introduced per unit of time into the first housing of a typical twin-screw extruder and reacted at temperatures of 120° C. to 240° C. to form a poly(urethane). At the end of the screw, the melt is delivered by a spinning pump at 210° C. to a single-bore nozzle heated to 205° C., run off at a rate of 100 m/minute in a stream of air, continuously stretched by a factor of 2 and wound up at a rate of 155 m/minute. The spinning draft is 489. The filament is then thermally aftertreated for 48 h at 90° C.

The textile data of the filaments are set out in the Table. As can clearly be seen, the filaments obtained do not have long hot-break times.

Production of an "EPIC" polyisocyanate (EPI)

The polyisocyanate containing isocyanurate and oxazolidinone groups was produced by the process described in EP 0 272 563 A2.

To this end, 1,140 parts by weight of 4,4'-diphenyl methane diisocyanate (NCO content 33.6%) are mixed at 50° C. with 60 parts by weight of the diglycidyl ether of bisphenol A (epoxide value 0.585) and 0.1 ml (0.64 mmole) of dimethyl benzylamine and the resulting mixture is subsequently heated for 2.5 hours to 110° C. A sample of the mixture is removed. The sample is a solid, tacky resin at room temperature and has an NCO content of 26.0%. The reaction is terminated by addition of 1.2 g of toluene sulfonic acid methyl ester. The mixture is heated for another 30 minutes to 120° C. and then cooled with ice water. The NCO content of a new sample is 24.7%, corresponding to an average NCO functionality of 2.22 NCO equivalents/mole.

EXAMPLE 1

4,813 Parts by weight (19.2 moles) of 4,4'-diphenyl methane diisocyanate are mixed at 55° C. with 192.8 parts by weight (0.5 mole) of the polyisocyanate EPI, corresponding to an NCO equivalent ratio of 97:3, and the resulting mixture is reacted with 15,000 parts by weight (7.5 moles) of poly(hexanediol-co-neopentyl glycol adipate)diol (OH value 56.1) as in Comparison Example 1a) to form a prepolymer with an isocyanate content of 5.12%.

100 Parts by weight of the prepolymer are chain-extended with 5.17 parts by weight (0.057 mole) of butane-1,4-diol in the same way as described in Comparison Example 1b) and the poly(urethane) melt formed is spun (nozzle temperature 210° C.). The textile data of the filaments are shown in the Table.

EXAMPLE 2

4,703 Parts by weight (18.8 moles) of 4,4'-diphenyl methane diisocyanate and 320.4 parts by weight (0.9 mole) of the polyisocyanate EPI, corresponding to an NCO equivalent ratio of 95:5, are reacted with 15,000 parts by weight (7.5 moles) of poly(hexanediol-co-neopentylglycol adipate) diol (OH value 56.1) in the same way as in Comparison Example 1a) to form a prepolymer having an isocyanate content of 5.10%.

100 Parts by weight of the prepolymer are chain-extended with 5.15 parts by weight (0.057 mole) of butane-1,4-diol in the same way as described in Comparison Example 1b) and the poly(urethane) melt formed is spun (nozzle temperature 215° C.). The textile data of the filaments are shown in the Table.

EXAMPLE 3

4,553 Parts by weight (18.2 moles) of 4,4'-diphenyl methane diisocyanate and 444.5 parts by weight (1.2 moles) of the polyisocyanate EPI, corresponding to an NCO equivalent ratio of 93:7, are reacted with 15,000 parts by weight (7.5 moles) of poly(hexanediol-co-neopentyl glycol adipate) diol (OH value 55.0) in the same way as described in Comparison Example 1a) to form a prepolymer with an isocyanate content of 4.92%.

100 Parts by weight of the prepolymer are chain-extended with 5 parts by weight (0.055 mole) of butane-1,4-diol in the same way as described in Comparison Example 1b) and the poly(urethane) melt formed is spun (nozzle temperature 215° C.).

The mechanical and thermal data of the PU filament are shown in the Table.

EXAMPLE 4

4,884 Parts by weight (17.5 moles) of 4,4'-diphenyl methane diisocyanate and 651.2 parts by weight (1.8 moles) of the polyisocyanate EPI, corresponding to an NCO equivalent ratio of 90:10, are reacted with 15,000 parts by weight (7.4 moles) of poly(hexanediol-co-neopentyl glycol adipate) diol (OH value 55.0) in the same way as described in Comparison Example 1a) to form a prepolymer with an isocyanate content of 4.91%.

100 Parts by weight of the prepolymer are chain-extended with 4.98 parts by weight (0.055 mole) of butane-1,4-diol in the same way as described in Comparison Example 1b) and the poly(urethane) melt formed is spun (nozzle temperature 225° C.). The textile data of the filaments are shown in the Table.

Comparison Example 2

660 Parts by weight (2.64 moles) of 4,4'-diphenyl methane diisocyanate are reacted with 2,000 parts by weight (1 mole) of poly(hexanediol-co-neopentyl glycol adipate)diol (OH value 55.9) at 110° C. to form a prepolymer with an isocyanate content of 5.17%.

151.4 Parts by weight (1.68 moles) of butane-1,4-diol are incorporated in the prepolymer so that a ratio of isocyanate to hydroxyl groups of around 0,985 is obtained in the reaction mixture. After mixing, the reaction mixture is poured into a mold heated to 120° C. and heated for 20 minutes at 110° C. After cooling, the material is size-reduced and ground to form granules.

2,000 Parts by weight of the granules obtained are mixed with 42.6 parts by weight (0.11 mole) of a polyisocyanate EPI with an average functionality of 2.22 and an isocyanate content of 24.3%, so that the ratio of isocyanate to hydroxyl groups, based on the starting materials, is now around 1.05. The mixture is then introduced into a single screw extruder and melt-spun at 230° C. through a single-bore nozzle at a take-off rate of 490 m/min. The monofilament obtained is cold-stretched by 40% and then thermally aftertreated under tension for 20 hours at 110° C. The textile data are shown in the Table.

It can clearly be seen that the filaments obtained by this process do not have sufficiently long hot-break times.

EXAMPLE 5

4,892 Parts by weight (19.6 moles) of 4,4'-diphenyl methane diisocyanate and 105.4 parts by weight (0.2 mole) of an isocyanurate of 2,4- and 2,6-toluene diisocyanate (80:20 isomer mixture) with an average functionality of 2.92 and an isocyanate content of 23.5%, corresponding to an NCO equivalent ratio of 98.5:1.5, are reacted with 15,000 parts by weight (7.4 moles) of poly(hexanediol-co-neopentyl glycol adipate)diol (OH value 55.0) as described in Comparison Example 1a) to form a prepolymer with an isocyanate content of 5.14%.

100 Parts by weight of the prepolymer are chain-extended with 5.21 parts by weight (0.059 mole) of butane-1,4-diol in the same way as described in Comparison Example 1b) and the poly(urethane) melt formed is spun (nozzle temperature 215° C.). The textile data of the filaments are shown in the Table.

Comparison Example 3

2,000 Parts by weight of the granules produced in Comparison Example 2 are mixed with 42.9 parts by weight (0.08 mole) of an isocyanurate of 2,4- and 2,6-toluene diisocyanate (80:20 isomer mixture) with an average functionality of 2.92 and an isocyanate content of 23.5%, so that the ratio of isocyanate groups to hydroxyl groups, based on the starting materials, is approximately 1.05. The mixture is then introduced into a single screw extruder and melt-spun at 245° C. through a single-bore nozzle at a take-off rate of 490 m/min. The monofilament obtained is cold-stretched by 40% and then thermally aftertreated under tension for 20 hours at 110° C. The textile data are shown in the Table.

Even where a pure isocyanurate is used, the filaments obtained by this process do not have sufficiently long hot-break times.

TABLE

| Example | NCO Eq. PI (%) | Denier (dtex) | TN (cN/dtex) | TN-act. (%) | MTE (%) | $\epsilon_R$ (%) | M100 (cN/dtex) | M300 (cN/dtex) | HDT (°C.) | HBT (s) | $\eta_i$ |
|---|---|---|---|---|---|---|---|---|---|---|---|
| Comp. 1 | 0 | 71 | 0.88 | 4.71 | 437 | 9 | 0.08 | 0.25 | 181 | 7.4 | 1.67 |
| 1 | 3 | 71 | 0.92 | 5.33 | 479 | 10 | 0.07 | 0.19 | 186 | 15.4 | insol. |
| 2 | 5 | 71 | 0.93 | 5.42 | 481 | 11 | 0.08 | 0.20 | 188 | 16.6 | insol. |
| 3 | 7 | 70 | 0.90 | 5.32 | 490 | 11 | 0.07 | 0.18 | 193 | 20.6 | insol. |
| 4 | 10 | 69 | 0.79 | 4.33 | 450 | 12 | 0.10 | 0.24 | 200 | 25.9 | insol. |
| Comp. 2 | 5 | 162 | 0.40 | 1.41 | 248 | 7 | 0.18 | — | 187 | 1.9 | insol. |
| 5 | 1.5 | 71 | 0.91 | 4.84 | 431 | 10 | 0.11 | 0.36 | 194 | 15.2 | insol. |
| Comp. 3 | 5 | 126 | 0.43 | 1.63 | 276 | 10 | 0.14 | — | 192 | <1 | insol. |

NCO Eq. PI: Percentage of NCO equivalents of the polyisocyanate in the total NCO content of the PU filament
TN: Tenacity
TN-act.: Tenacity, based on starting denier
MTE: Maximum tensile elongation (breaking elongation)
$\epsilon_R$: Residual elongation after 5x elongation to 300%
M100/M300: Modulus at 100% and 300% elongation
HDT: Heat distortion temperature (temperature at which the filament breaks under a defined load)
HBT: Hot-break time (time at which the filament of defined elongation breaks at 193° C.)
$\eta_i$: $\eta$ intrinsic;
insol.: Filament is insoluble

We claim:
1. A process for the production of elastane filaments comprising continuously reacting together
   a) at least one macrodiol having a molecular weight of 1000 to 8000,
   b) at least one diisocyanate,
   c) at least one polyisocyanate having an average functionality of greater than 2,
   d) diols having a molecular weight of up to 400 as chain-extending agents,
   e) optionally catalysts and
   f) optionally other auxiliaries and additives,
component (c) consisting of an isocyanurate polyisocyanate with an average functionality of greater than 2, components (b) and (c) being used in such a quantity ratio that the ratio of the number of isocyanate equivalents of component (b) to the number of isocyanate equivalents of component (c) is 99.5:0.5 to 80:20, to form a polyurethane, directly spinning the polyurethane through a nozzle without any further intermediate steps thereby to form elastane filaments, and thermally aftertreating the elastane filaments.

2. A process as claimed in claim 1, wherein components a), b), c) and d) are reacted by a one-shot process or by a prepolymer process and the sum total of components b)+c)+d) in the elastane filament is 5% to 30% by weight, based on the sum total of components a)+b)+c)+d).

3. A process as claimed in claim 2, wherein a prepolymer is initially prepared discontinuously or continuously in several steps by a prepolymer process from at least parts of component (a) and at least parts of components (b) and (c), the ratio of the sum of isocyanate equivalents of components (b) and (c) to the number of hydroxyl equivalents of component (a) in the prepolymer being 1.05:1 to 10:1, and the prepolymer obtained is subsequently reacted together with the remainder of starting materials (d) and (e) and (f) if present and the remainders of components (a), (b) and (c) to form the poly(urethane).

4. A process as claimed in claim 3, wherein the chain extension of the prepolymer is carried out in a self-cleaning multiscrew extruded optionally equipped with kneading elements at a temperature of 80° C. to 260° C. and with a residence time of the reaction melt in the extruder of 0.5 to 20 minutes.

5. A process as claimed in claim 1, wherein the temperature of the spinning nozzle is 180° to 240° C. and the filaments formed are taken off at a rate of 100 to 800 m/min.

6. A process as claimed in claim 1, wherein the filaments are subjected to a thermal aftertreatment for 1 to 96 hours at a temperature of 60° to 120° C.

7. A process as claimed in claim 1, wherein the filaments are subjected to a thermal aftertreatment in air for 16 to 48 hours at a temperature of 80° C. to 100° C.

8. A process as claimed in claim 1, wherein after cooling, the filaments are stretched in a ratio of 1.1 to 4:1 and then relaxed.

9. A process as claimed in claim 1, wherein polyester diols, polyether diols, polyacetal diols, polycarbonate diols and other dihydroxyl compounds with a molecular weight of 1,000 to 6,000 are used as the macrodiol compounds a).

10. A process as claimed in claim 1, wherein polyester diols, polyether diols or mixtures thereof with a molecular weight of 1,500 to 4,000 are used as the macrodiol compounds a).

11. A process as claimed in claim 10, wherein mixed polyester diols of dicarboxylic acids containing six or more carbon atoms and 2 to 4 different diols containing four or more carbon atoms or polytetramethylene oxide diols or copolyether diols thereof with other ether-forming compounds, such as ethylene oxide or propylene oxide, are used as the macrodiol compounds a).

12. A process as claimed in claim 1, wherein aromatic diisocyanates, optionally combined with relatively small amounts of (cyclo)aliphatic diisocyanates, or (cyclo)aliphatic diisocyanates alone are used as the diisocyanates b).

13. A process as claimed in claim 1, wherein isocyanurate-modified polyisocyanates or oligomers of (cyclo)aliphatic diisocyanates are used as the polyisocyanates c).

14. A process as claimed in claim 1, wherein ethane-1,2-diol, propane-1,2- and -1,3-diol, 2,2-dimethyl propane-1,3-diol, hexane-1,6-diol, 3-methyl pentane-1,5-diol, 1,4-cyclohexanediol, 1,4-bis-(2-hydroxyethoxybenzene) orbis-(2-hydroxyethoxy)-terephthalate are used as the diols d).

15. Elastane filaments obtained by the process claimed in claim 1.

16. Elastane filaments as claimed in claim 15 with a heat distortion temperature of at least 185° C. and a hot break time of at least 10 s.

* * * * *

UNITED STATES PATENT AND TRADEMARK OFFICE
CERTIFICATE OF CORRECTION

PATENT NO. : 5,565,270
DATED : October 15, 1996
INVENTOR(S) : Rehbold, et al.

It is certified that error appears in the above-indentified patent and that said Letters Patent is hereby corrected as shown below:

Col. 13, line 20   Delete " extruded " and substitute
                   -- extruder --

Signed and Sealed this

Twelfth Day of August, 1997

*Attest:*

BRUCE LEHMAN

*Attesting Officer*     *Commissioner of Patents and Trademarks*